United States Patent [19]
Kuchnir

[11] 3,979,164
[45] Sept. 7, 1976

[54] EXPANSION JOINT LOCK FOR LOW TEMPERATURE STRUCTURES

[75] Inventor: Moyses Kuchnir, Elmhurst, Ill.

[73] Assignee: Wisconsin Alumni Research Foundation, Madison, Wis.

[22] Filed: Jan. 30, 1975

[21] Appl. No.: 543,331

[52] U.S. Cl. .................................... 403/28; 29/434; 29/461; 60/671; 62/47; 114/74 R; 269/7; 403/31; 403/270; 404/49
[51] Int. Cl.² ...................... F16C 9/00; F16D 1/00; F16B 7/00
[58] Field of Search ................... 403/31, 50, 39, 83, 403/270, 28; 269/7; 62/45, 47, 240; 114/74 R; 60/671

[56] References Cited
UNITED STATES PATENTS

| | | | |
|---|---|---|---|
| 2,937,437 | 5/1960 | Cole et al. ........................... | 269/7 X |
| 2,938,359 | 5/1960 | Cobb et al. .......................... | 62/47 |
| 3,574,257 | 4/1971 | DuBois ................................ | 269/7 X |
| 3,834,174 | 9/1974 | Strumbos ............................ | 62/240 X |
| 3,864,927 | 2/1975 | Li........................................ | 62/240 X |

FOREIGN PATENTS OR APPLICATIONS

| | | | |
|---|---|---|---|
| 1,453,823 | 8/1966 | France ................. | 404/47 |
| 746,589 | 3/1956 | United Kingdom .................. | 404/47 |
| 1,008,218 | 10/1965 | United Kingdom .................. | 403/31 |

Primary Examiner—Werner H. Schroeder
Assistant Examiner—Wayne L. Shedd
Attorney, Agent, or Firm—Theodore J. Long; John M. Winter; Harry C. Engstrom

[57] ABSTRACT

An expansion joint lock for transmitting forces between structural members that contract as they are cooled down to operating temperatures. A piston member mounted to one structural member is slidingly engaged with a chamber in a reception member which is mounted to a second structural member. The remaining space in the chamber is filled with a liquid which freezes at a temperature somewhat above the operating temperature of the structure, allowing forces to be transmitted between the structural members by the frozen liquid.

6 Claims, 2 Drawing Figures

EXPANSION JOINT LOCK FOR LOW TEMPERATURE STRUCTURES

BACKGROUND OF THE INVENTION

1. Field of the Invention

This invention pertains generally to the field of cryogenic devices and supporting structure, and more particularly to expansion joints and locks for cryogenic supporting members.

2. Description of the Prior Art

It is often necessary to provide support structure for devices which operate at cryogenic temperatures, examples of which include electrical storage magnets and magnets for fusion reactors. The forces which may be developed by such devices generally must be transmitted from the cold temperature device structure to a warm (room temperature) surrounding support structure. A significant problem is encountered when the devices are cooled down from room temperature to their cryogenic operating temperatures. Such cooling may involve a decrease in temperature of 200° – 300° Centigrade. Since the support structure material will contract when its temperature is lowered, the supporting members of the cryogenically operative devices will undergo a considerable amount of contraction as the temperature of the device is lowered from room temperature to cryogenic temperatures. It is thus necessary to either use materials which undergo very little change in dimension when their temperature is lowered, or to somehow compensate for the decrease in the length of the supporting members. The problem becomes particularly acute when structural materials having differing coefficients of thermal expansion are joined together.

SUMMARY OF THE INVENTION

I have invented an expansion joint lock for support members that are being operated at very low temperatures, such as the cryogenic temperatures encountered when operating superconducting electrical devices. My expansion joint lock is adapted to transmit linear compression forces between two structural members. In a typical case one of the structural members would be rigidly connected to the cryogenically operative device being supported, while the other structural member would be connected to a surrounding room temperature support, with forces being transmitted from the device through the structural members to the surrounding support. As the ambient temperature of the support structure is lowered, the two structural members will tend to contract and their ends will tend to draw away from each other. My expansion joint lock allows this contraction to take place unimpeded, but will provide a rigid connection between the two structural members when compressive forces are exerted by the device on the structural member attached thereto. The expansion joint lock may also be utilized to transmit tension forces between two structural members having, for example, overlapping inverted ends, with the expansion joint lock being mounted to transmit compression forces between the overlapping ends.

My expansion joint lock has a piston member which is mounted to one of the structural members, and a reception member which is mounted to the other structural member. The piston member is received in a chamber in the reception member and is slidingly engaged with the walls of the chamber. A liquid is introduced into the space in the chamber left between the end of the piston and the walls of the chamber. This liquid preferably remains in its liquid state until the supporting structure is nearly at its cryogenic operating temperature, at which point the liquid freezes. Thus any compressive forces exerted on the structural member attached to the cryogenic device will be transmitted by the piston to the solid material filling the chamber and thence to the structural member which is attached to the surrounding room temperature support. Means are provided to seal the liquid within the chamber during the expansion and contraction process, and to prevent evaporative losses into the evacuated space surrounding the expansion joint lock.

Further objects, features and advantages of my invention will become apparent from the following detailed description taken in conjunction with the accompanying drawings showing preferred embodiments of my invention.

DESCRIPTION OF THE PREFERRED EMBODIMENTS

Figure 1:
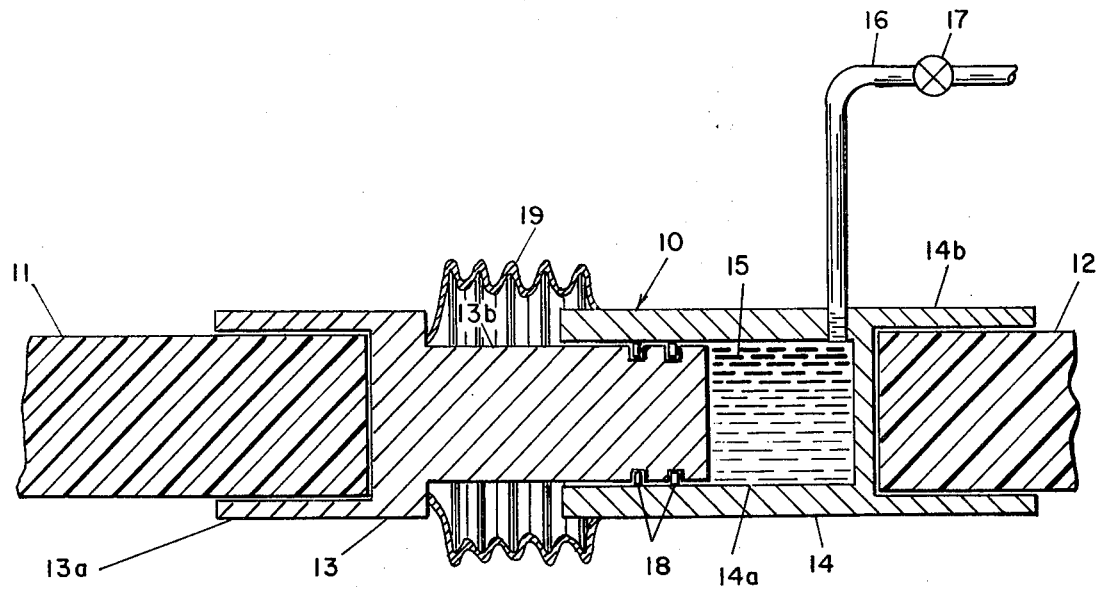
FIG. 1 is a cross-sectional view of a expansion joint lock mounted to two separate structural members.

Referring now more particularly to the drawing, wherein like numerals refer to like parts in both views, a preferred embodiment of an expansion joint lock is shown generally at 10 in FIG. 1. The lock 10 is adapted to transmit substantially linear compression forces between two structural members such as the structural members 11 and 12 shown in FIG. 1. The structural members 11 and 12 may be the inverted overhanging end portions of two structural members which carry tension forces. For such a case, tension forces on the main structural members would be seen as compressive forces between the inverted end portions. The structural members 11 and 12 may comprise a portion of the structural support for a cryogenic operative device such as an electrical superconducting storage magnet. For such a case, the supporting members would be transmitting forces between a structure at cryogenic temperatures and surrounding room temperature supporting structure, and thus would preferably be composed of a heat insulating material such as epoxy-fiberglass.

As the electrical magnet or other device being operated at cryogenic temperatures is cooled down to its operating temperature, the supporting structure which also undergoes cooling will experience thermal contraction. The degree of thermal contraction will be determined by the character of the supporting structure material and the length of the supporting members that undergo cooling. It is, however, to be expected that substantial changes in the linear dimensions of supporting members will be experienced as the structure is cooled down.

My expansion joint lock 10 has a piston member 13 which is mounted to the structural member 11. The piston member 13 may be mounted to the structural member 11 by means of a hollow sleeve portion 13a which fits closely over the end of the structural member 11. The sleeve portion 13a restrains lateral movement of the piston member on the end of the structural member 11. Since the forces to be transmitted by the structural members 11 and 12 will be compressive in nature, it is not necessary to have a strong rigid bond between the piston member and the structural member 11 to prevent separation from tension forces. However, it is preferable that the structural member 11 and the piston member 13 be connected together with a weld or other mechanical means so that the two members will remain joined when the structure contracts and the structural member 11 moves away from the structural member 12. The piston member also has a piston portion 13b extending in the direction of the linear forces to be transmitted. The piston porton 13b is engaged with a reception member 14 which has a chamber 14a therein which is adapted to receive and slidingly engage the piston portion 13b, with the walls of the reception member chamber fitting closely around the piston portion. Although the piston portion 13b and the chamber 14a may be made with a conventional cylindrical shape, the periphery of the piston portion 13b and the chamber 14a may be made non-circular to prevent rotation of the piston portion within the chamber. As shown in FIG. 1, the reception member 14 also has a hollow sleeve portion 14b which fits closely around the end of the structural member 12. The sleeve portion 14b is also preferably welded or otherwise attached to the structural member 12.

As shown in FIG. 1, there is a space in the chamber 14a between the walls of the chamber and the end of the piston portion 13b. This space will vary in volume as the structural members 11 and 12 cool down and contract, with the space in the chamber 14a becoming larger and larger as the temperature decreases. When the cryogenic operating temperature is obtained there is a considerable space in the chamber 14a between the piston portion 13b and the end of the chamber. Compression forces on the structural member 11 could not be transmitted to the structural member 12 if the chamber 14a were left empty. Thus, to provide a means for maintaining the chamber filled with a liquid 15 the liquid is introduced into the chamber through a pipe 16 having a control valve 17 from a reservoir and pump (not shown), with the control valve 17 insuring that the chamber is filled with the liquid 15, but without providing excessive pressure on the liquid. Since the expansion joint lock 10 is contemplated for use in a cryogenic environment, the liquid 15 would preferably have a very low freezing point, only somewhat above the operating temperature of the support structure. Generally, I have found that liquid nitrogen is most suitable for use as the liquid 15 to fill the space in the chamber 14a where the operating temperature is just a few degrees above absolute zero. Nitrogen is desirable since at atmospheric pressure it has a melting point at approximately 63°K and a boiling point at approximately 78°K. In operation then, as the structural members 11 and 12 are cooled down and contract, the space in the chamber 14a is continually maintained filled with the liquid 15. At some point above the operating temperature of the structure, the liquid 15 freezes solid and no more liquid can be introduced into the chamber. If the temperature at which the liquid 15 freezes is not substantially above the operating temperature of the structure, further lowering of the ambient temperature of the structural members 11 and 12 will not result in a substantial retraction of the piston portion 13b away from the frozen liquid 15. Thus, when compressive forces are exerted on the structural member 11, these forces will be transmitted through the piston portion 13b to the frozen liquid 15 and thence to the reception member 14 and the structural member 12. To inhibit leakage of the liquid 15 between the walls of the chamber 14a and the piston portion 13b, it is desirable to have seals 18 on the piston portion 13b which are in sliding contact with the walls of the chamber 14a. It is common practice when providing insulation for cryogenic devices to evacuate the space surrounding the supporting structure to prevent conductive and convective loss of heat. Thus it is highly desirable to have a means to prevent sublimation or evaporation of the liquid 15 in either its liquid or solid state into the evacuated air space surrounding the expansion joint lock. This may be accomplished by providing a flexible substantially air-tight bellows 19 which is attached with substantially air-tight seals at one end of the bellows to the reception member 14 and at the other end of the bellows to the piston member 13.

Figure 2:
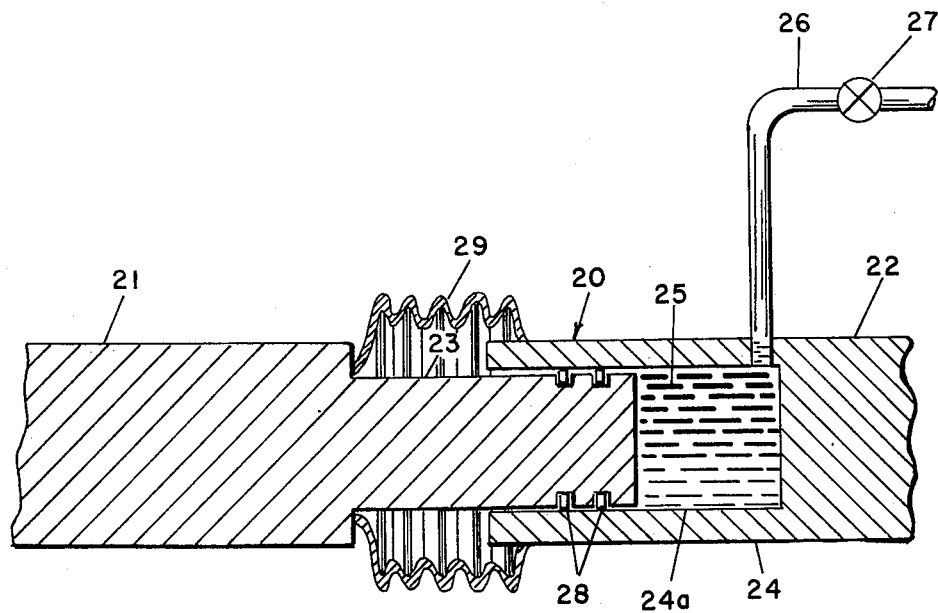
FIG. 2 is a cross-sectional view of an alternative embodiment of a expansion joint lock wherein the expansion joint lock is formed integrally with two structural members.

While it is anticipated that supporting structure members for cryogenic devices will be composed of insulating material which does not have high sheer strength, it may be desirable in some circumstances to employ support members which are composed of other materials such as stainless steel or aluminum. In such cases it may be possible and even preferable to form a support structure lock integrally with the supporting members. Thus an alternative embodiment of my expansion joint lock which is formed integrally with the support members is shown generally at 20 in FIG. 2. The expansion joint lock 20 will transmit forces between a structural member 21 and a second structural member 22. The joint lock 20 has a piston portion 23 which extends from and is integrally formed with the structural member 21, as shown in FIG. 2. The piston portion 23 is engaged with a reception member 24 which is formed integrally with the second structural member 22. The reception member 24 has a hollow chamber 24a therein which fits closely over and slidingly engages the piston portion 23. As for the case of the expansion joint lock 10, the space in the chamber 24a between the piston portion 23 and the reception member 24 is maintained filled with a liquid 25 which has a melting point somewhat above the cryogenic operating temperature of the support structure. The liquid 25 may also consist of liquid nitrogen, which has the desirable freezing and boiling characteristics described above. The liquid 25 is supplied to the chamber 24a through a pipe 26 and a control valve 27 from a reservoir and pump (not shown) which provides the liquid 25 under pressure. Seals 28 are also preferably provided on the piston portion 23 to inhibit leakage of the liquid 25 between the walls of the chamber 24a and the piston portion. A flexible air-tight bellows 29 may be attached and sealed at one end thereof to the reception member 24 and at the other end thereof to the piston portion 23 to inhibit loss of the liquid 25 into the evacuated space surrounding the expansion joint lock 20.

It is apparent that my expansion joint lock can be utilized to transmit forces between two structural members which carry tension forces. For example, the two structural members may have L-shaped ends which overlap. My expansion joint lock may be attached between the extending portions of the L-shaped ends of the structural members. As the structural members cool down and contract in length, the expansion joint lock will be compressed between the two extending portions as they draw closer together. At operating temperatures, the liquid in the expansion joint lock will be frozen, allowing compression forces to be transmitted across the joint lock corresponding to the tension forces in the structural members.

It is understood that my invention is not confined to the particular construction and arrangement of parts herein illustrated and described, but embraces all such modified forms thereof as come within the scope of the following claims.

I claim:

1. An expansion joint lock for transmitting compression forces between two structural members which contract as they are cooled down to the temperatures at which they carry loads, comprising:
   a. a piston member having an extending piston portion;
   b. means for mounting said piston member to a first of the structural members with said piston portion thereof extending in the direction of the compression forces to be transmitted;
   c. a reception member having walls defining a chamber therein adapted to receive and slidingly engage said piston portion of said piston member;
   d. means for mounting said reception member on the second of the structural members in position to have said chamber therein receive and engage said piston portion; and
   e. means for maintaining the space in said chamber between the walls of said chamber and said piston portion filled with a liquid having a freezing point above the ambient temperature at which said structural members normally carry loads, whereby said liquid is frozen in said chamber at the ambient temperature at which said structural members carry loads to allow transmission of forces between said structural members through said frozen liquid.

2. The expansion joint lock as specified in claim 1 wherein said piston member is formed integrally with the first structural member and said reception member is formed integrally with the second structural member.

3. The expansion joint lock as specified in claim 1 wherein the structural members normally carry loads at cryogenic temperatures and said liquid is liquid nitrogen.

4. The expansion joint lock as specified in claim 1 wherein said piston portion of said piston member is cylindrical and said chamber in said reception member is cylindrical and is adapted to receive and slidingly engage said cylindrical piston portion.

5. The expansion joint lock as specified in claim 1 including means for providing a substantially liquid tight seal between said piston portion of said piston member and said chamber in said reception member.

6. The expansion joint lock as specified in claim 1 including a flexible bellows attached at one end thereof to said piston member and at the other end thereof to said reception member, said bellows being substantially air-tight and being attached to said piston member and said reception member with substantially air-tight seals therebetween, thereby inhibiting evaporation of said liquid from said chamber in said reception member.

* * * * *